(12) United States Patent
Pham et al.

(10) Patent No.: US 7,459,048 B2
(45) Date of Patent: Dec. 2, 2008

(54) ONE-PIECE INNER SHELL FOR FULL BARREL COMPOSITE FUSELAGE

(75) Inventors: Doan D. Pham, Tacoma, WA (US); Mark W. Tollan, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 319 days.

(21) Appl. No.: 11/343,701

(22) Filed: Jan. 31, 2006

(65) Prior Publication Data

US 2007/0175031 A1    Aug. 2, 2007

(51) Int. Cl.
*B65H 81/00* (2006.01)
(52) U.S. Cl. .................... 156/173; 156/169; 156/175
(58) Field of Classification Search ............ 156/173, 156/175, 169
See application file for complete search history.

(56) References Cited

U.S. PATENT DOCUMENTS

| | | | | | |
|---|---|---|---|---|---|
| 3,999,912 | A | * | 12/1976 | Hall | 425/84 |
| 5,192,384 | A | * | 3/1993 | Barrier et al. | 156/189 |
| 5,223,067 | A | * | 6/1993 | Hamamoto et al. | 156/173 |
| 5,814,386 | A | * | 9/1998 | Vasiliev et al. | 428/36.3 |
| 6,050,315 | A | * | 4/2000 | Deckers et al. | 156/433 |
| 6,245,274 | B1 | * | 6/2001 | Huybrechts et al. | 264/257 |
| 6,613,258 | B1 | * | 9/2003 | Maison et al. | 264/102 |
| 2004/0216805 | A1 | * | 11/2004 | Teufel | 141/11 |

FOREIGN PATENT DOCUMENTS

JP          61-169394 A    *    7/1968

OTHER PUBLICATIONS

Kuang-Hua Chang, "All-Digital Design and Manufacturing (ADDM) A New Development In Engineering Education," Exploring Innovation in Education and Research, Mar. 1-3, 2005, p. 1-8, Tainan, Taiwan.

* cited by examiner

*Primary Examiner*—Jeff H Aftergut
(74) *Attorney, Agent, or Firm*—Ostrager Chong Flaherty & Broitman P.C.

(57) ABSTRACT

A method of manufacturing a unitary seamless section of an aircraft fuselage comprises disposing a thin lay-up mandrel element onto the outer shell surface of a cylindrical inner mandrel shell, thereby forming a mandrel with a lay-up surface. A plurality of resin impregnated stiffener fibers may be layed-up within a plurality of stiffener channels in the lay-up surface to form a plurality of stiffeners or stringers. The method further includes laying up a plurality of resin impregnated skin fibers onto the lay-up surface while the mandrel rotates to form a unitary pre-cured section of an aircraft fuselage.

14 Claims, 5 Drawing Sheets

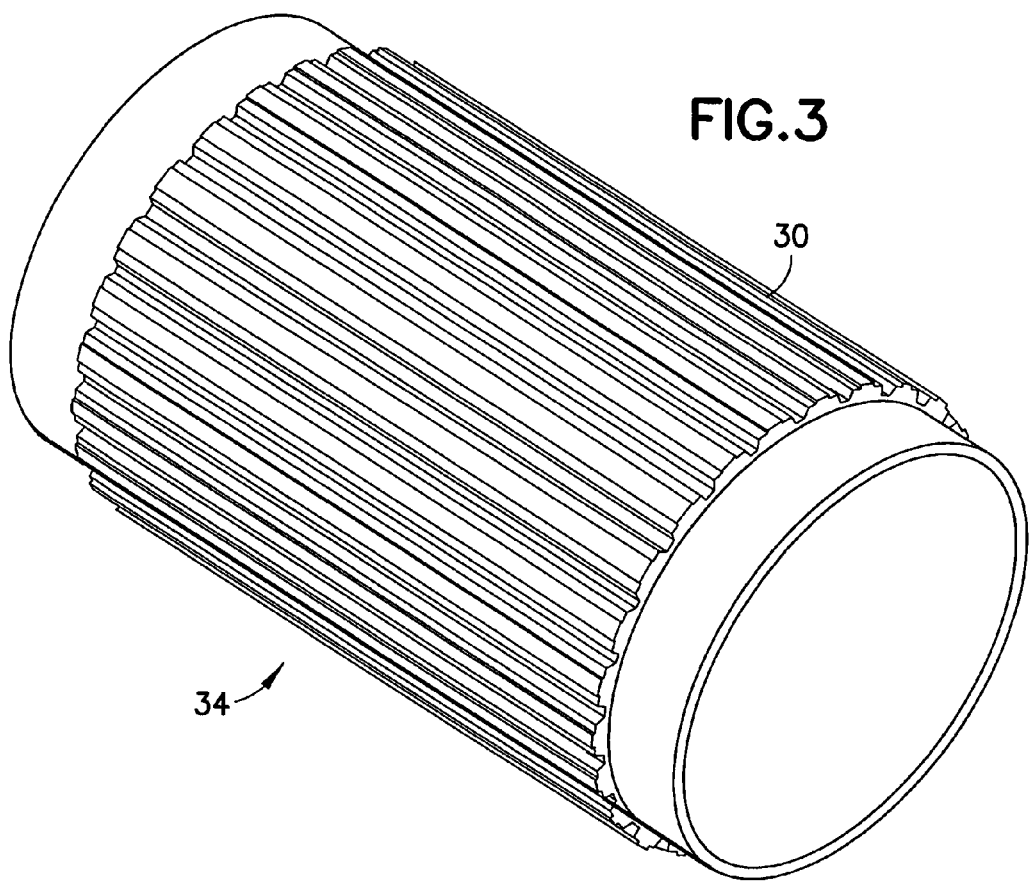
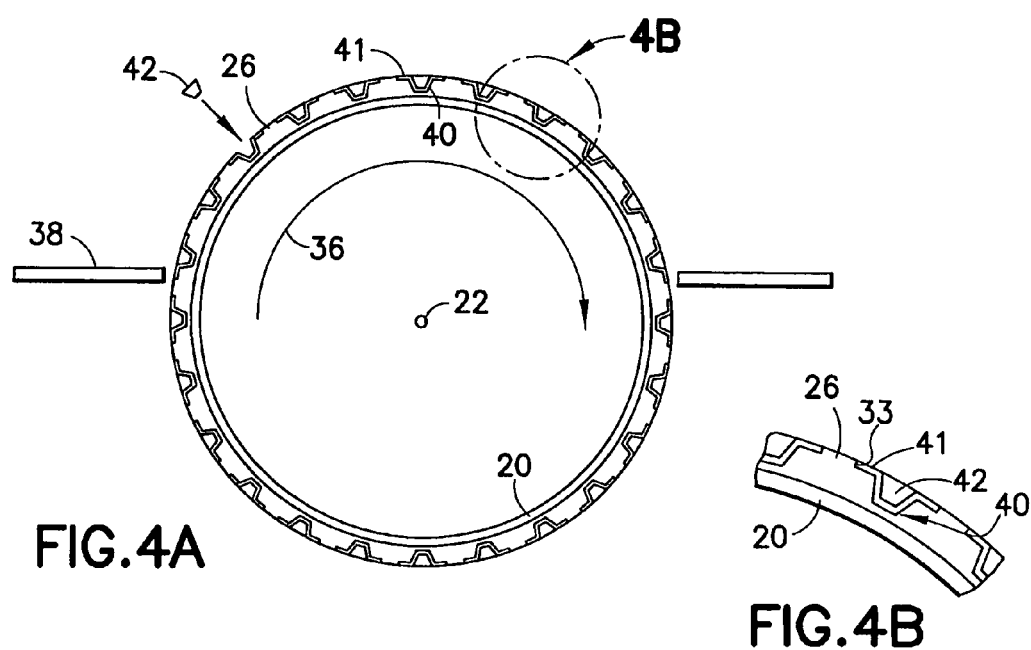

us 7,459,048 B2

ONE-PIECE INNER SHELL FOR FULL BARREL COMPOSITE FUSELAGE

TECHNICAL FIELD

The present invention relates generally to a one-piece inner shell for full-barrel composite fuselage manufacture, and, more particularly to a mandrel assembly providing for the manufacture of a unitary seamless section of an aircraft fuselage.

BACKGROUND OF THE INVENTION

Composite structures are highly prized for their ability to combine high strength and design flexibility with resultant reduced weight structures. As such, in many fields they dominate the manufacturing landscape. Despite their popularity, or perhaps as a result of it, composite lay-up structures have generated a host of new manufacturing challenges. These challenges often stem from attempts to apply the composite design methodologies to complex structures. Large-scale structures such as aircraft fuselage structures provide considerable challenges to composite lay-up manufacturing.

Present composite lay-up fuselage methodologies approach fuselage manufacturing through the use of multi-piece sections requiring longitudinal splices between individual sections. This generates an increase in weight and cost of the resultant product. In addition, the tooling is often comprised of multi-sectional tooling that requires seals between tooling sections. These seals are prone to leakage and often fail to provide the vacuum integrity needed for an autoclave curing procedure. This further complicates and diminishes fuselage lay-up manufacturing. An apparatus and method for laying up a single-piece fuselage section that eliminated the need for seals and had improved vacuum integrity during autoclave procedures would allow for a reduction in weight and cost of both tooling as well as the finalized fuselage section.

It would, therefore, be highly desirable to provide a one-piece fuselage mandrel capable of laying up a fuselage section without the need for seals. Similarly, it would be highly desirable to have a methodology for manufacturing a unitary seamless section of an aircraft fuselage.

SUMMARY OF THE INVENTION

A method of manufacturing a unitary seamless section of an aircraft fuselage is comprised of disposing a thin lay-up mandrel element onto the outer shell surface of a cylindrical inner mandrel shell, thereby forming a mandrel with a lay-up surface. A plurality of resin impregnated stiffener fibers may be layed-up within a plurality of stiffener channels in the lay-up surface to form a plurality of stiffeners or stringers. The method further includes laying up a plurality of resin impregnated skin fibers onto the lay-up surface while the mandrel rotates to form a unitary pre-cured section of an aircraft fuselage.

Other features of the present invention will become apparent when viewed in light of the detailed description of the preferred embodiment when taken in conjunction with the attached drawings and appended claims.

BRIEF DESCRIPTION OF THE DRAWINGS

FIG. 3 is an illustration of a mandrel for use in manufacturing the unitary seamless section of aircraft fuselage illustrated in FIG. 1, the mandrel illustrated with the entire thin lay-up mandrel element installed;

FIG. 4A is an illustration of the mandrel assembly from FIG. 3 in operation wherein a plurality of stiffeners are being laid-up;

FIG. 4B is a detailed illustration of a portion of the mandrel assembly illustrated in FIG. 4A;

DESCRIPTION OF THE PREFERRED EMBODIMENT(S)

Figure 1:
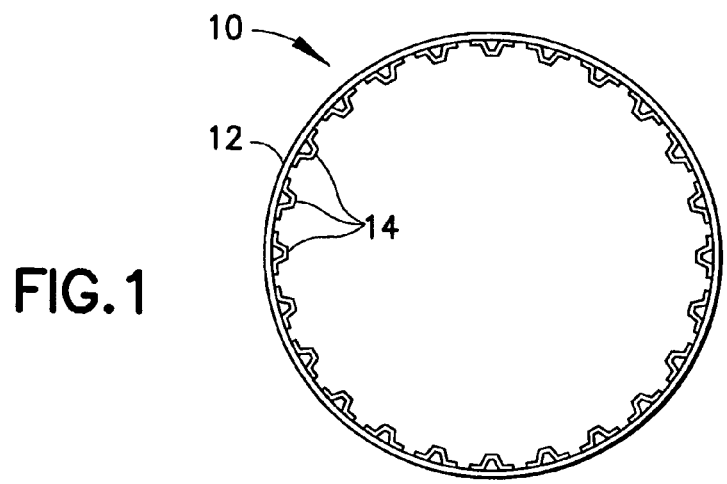
FIG. 1 is an illustration of a unitary seamless section of aircraft fuselage in accordance with a number of embodiments.

FIG. 1 is an illustration of a unitary seamless composite section of aircraft fuselage 10 in accordance with a number of embodiments. It is contemplated that a "section" of an aircraft fuselage is defined as a generally tubular section or barrel of the fuselage, particularly one that is made from a composite. A plurality of such sections 10 may be attachable end to end to form a longer barrel or section of the fuselage. It is intended that the term "unitary" is defined as a one-piece continuous, contiguous, seamless section of fuselage. The unitary seamless section of aircraft fuselage 10 is comprised of a fuselage skin 12 and a plurality of fuselage stiffeners 14 formed on the inner surface of the fuselage skin 12.

Figure 2:
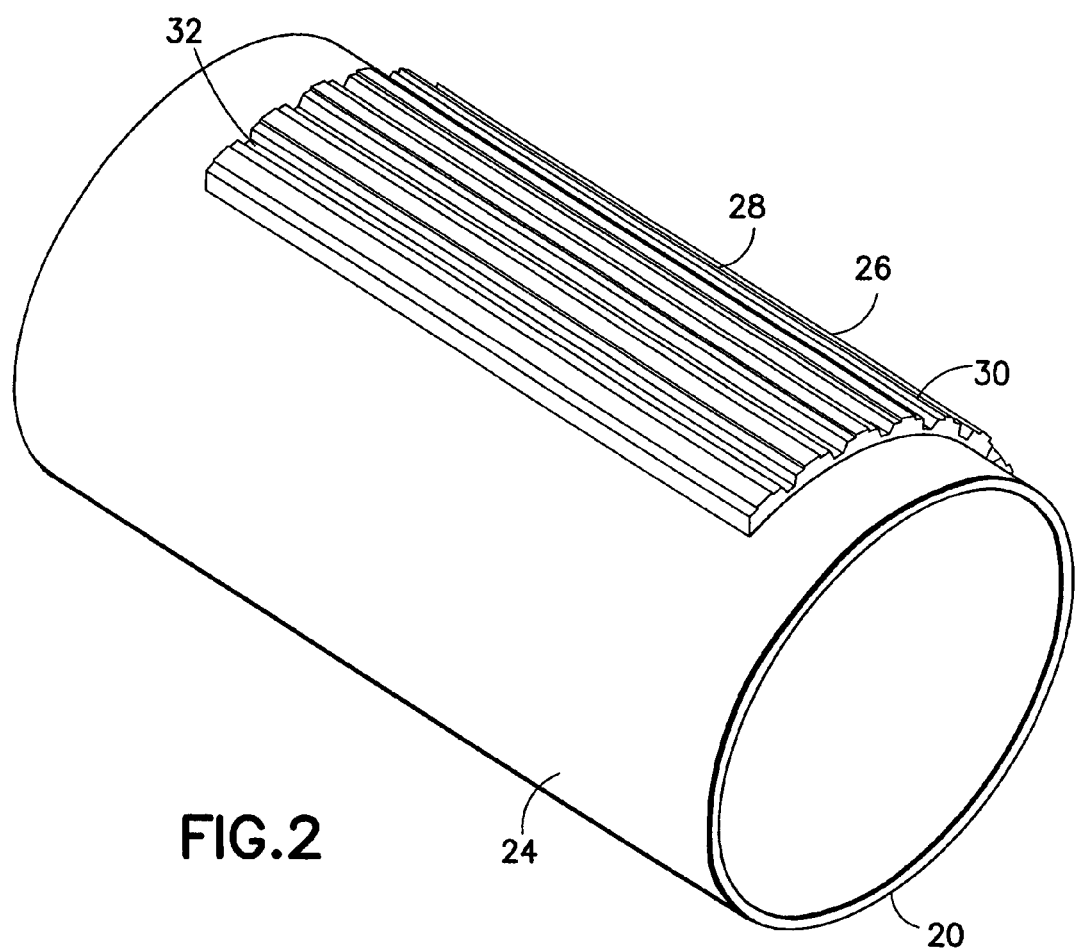
FIG. 2 is an illustration of a mandrel for use in manufacturing the unitary seamless section of aircraft fuselage illustrated in FIG. 1, the mandrel illustrated with only a partial amount of the thin lay-up mandrel element installed.

The section of fuselage 10 is formed in a novel and unique methodology. In a number of embodiments, the method utilizes a one-piece cylindrical inner mandrel shell 20 (FIG. 2) rotatable about a mandrel axis 22 (FIG. 4A), which provides a hard, continuous surface that prevents leaks during the curing process. The one-piece generally cylindrical inner mandrel shell 20 includes an outer shell surface 24 to which a thin lay-up mandrel element 26 can be mounted. Although a variety of thin lay-up mandrel elements 26 are contemplated, one embodiment contemplates the use of a plurality of caul plates 28 abutted end-to-end around the outer shell surface 24 to form a contiguous lay-up surface 30. The caul plates 28 may be any hard material, for example, metal or graphite materials, and may be temporarily clamped or screwed to the inner mandrel shell 20 to maintain their position. The thin lay-up mandrel element 26 preferably includes a plurality of stiffener channels 32 formed therein. The thin lay-up mandrel element 26 (e.g., the plurality of caul plates 28) and solid one-piece cylindrical inner mandrel shell 20 act together to form a mandrel 34 (FIG. 3).

Figure 5:
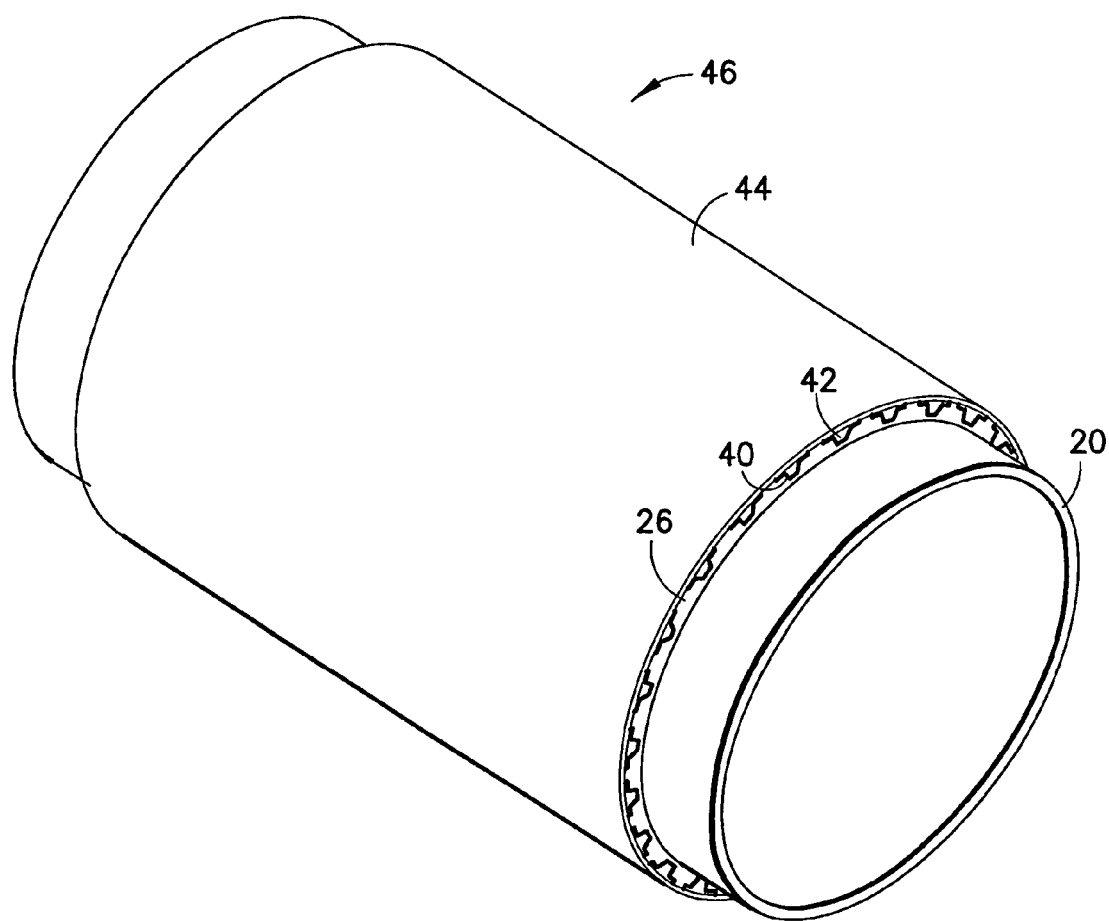
FIG. 5 is an illustration of the mandrel assembly from FIG. 4 in operation wherein a plurality of resin impregnated skin fibers are being laid-up.

By orientating the mandrel 34 horizontally and rotating it in one direction 36 about the mandrel axis 22, lay-up may be accomplished by way of a work platform 38 positioned adjacent the mandrel 34 as shown in the embodiment of FIG. 4A. A plurality of resin impregnated stiffener fibers 40 (or "stringers") are laid up within each of the plurality of stiffener channels 32 as the mandrel rotates. The stiffener channels 32 are provided with a longitudinal groove 33 (FIG. 4B) that accepts the top ends 41 of the stiffener fibers 40 to form a flush mandrel surface. A plurality of rubber mandrels 42 may be inserted into each of the stiffener channels 32 after lay-up of the stiffener fibers 40 in order to insure proper stiffener shape prior to curing. After curing, the rubber mandrels 42 are removed. Following the lay-up of stiffener fibers 40, the present invention contemplates the lay-up of a plurality of resin impregnated skin fibers 44 on top of the plurality of resin impregnated stiffener fibers 40. The number of skin fibers 44 used depends on the end-use application. For example, any number of layers from 3 to about 40 may be used. In general, stronger fuselages able to withstand high pressure require more layers. The resultant structure as shown in FIG. 5 is a pre-cured section of an aircraft fuselage 46 still attached to the mandrel.

Figure 6:
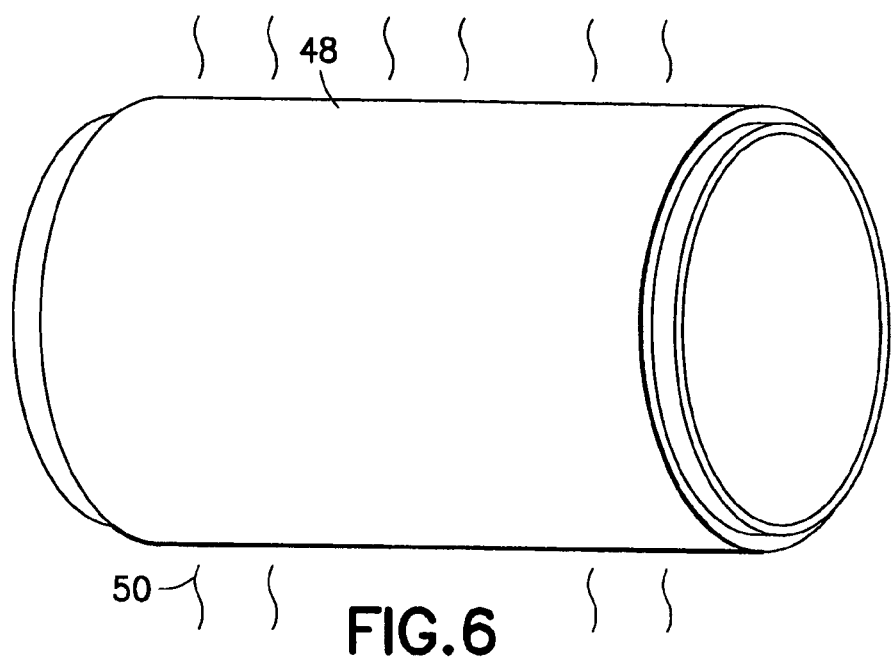
FIG. 6 is an illustration of the mandrel assembly from FIG. 5 in operation wherein the mandrel and lay-ups are vacuum bagged and cured.

The pre-cured section of an aircraft fuselage 46 may be manufactured in some of the embodiments without utilizing tooling that requires seals. The solid one-piece cylindrical inner mandrel shell 20 also permits the mandrel 34 to be subjected to vacuum forces without any concern of seal leakage. Accordingly, in a number of embodiments, the pre-cured section 46 may be vacuum bagged 48 while still on the mandrel, with the assembly then being subject to curing 50 (FIG. 6). After curing, the vacuum bagging 48 is removed. The end result of curing is that the unitary seamless section of aircraft fuselage 10 is generated. The unitary section 10 may then be removed from the mandrel 34 to be utilized in the manufacture of an aircraft.

Figure 7:
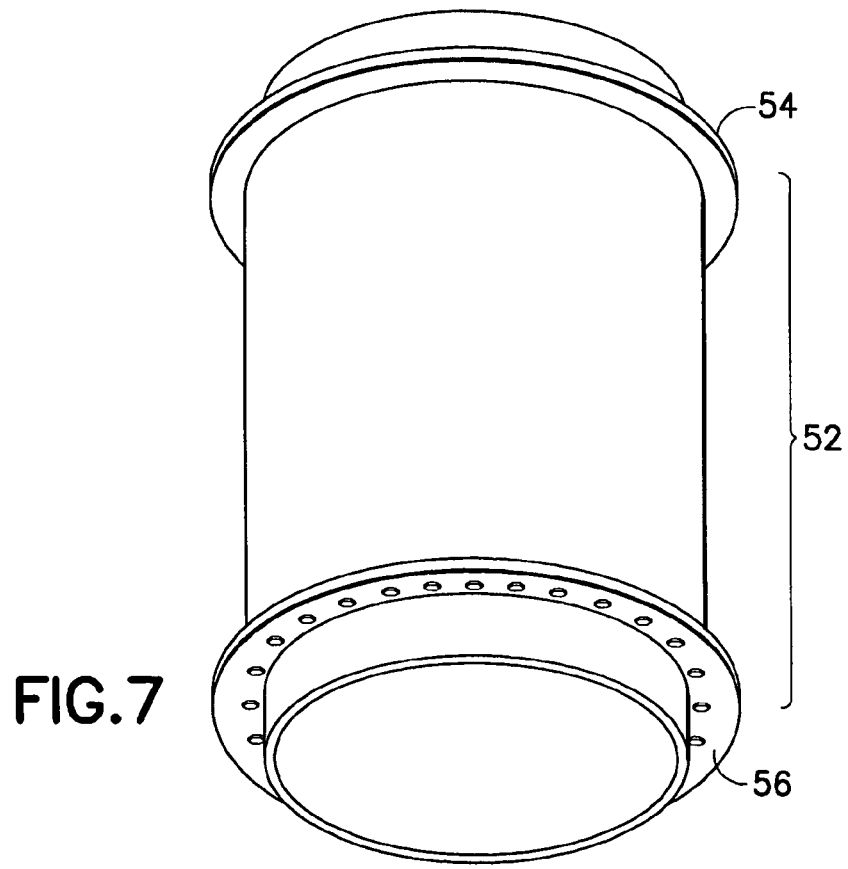
FIG. 7 is an illustration of an alternate embodiment of the mandrel assembly illustrated in the preceding figures, the embodiment including a first and second support ring mounted to the thin lay-up mandrel element.
Figure 9:
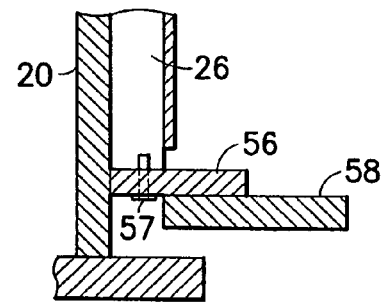
FIG. 9 is a detailed illustration of a portion of the thin mandrel shell and thin lay-up mandrel illustrated in FIG. 8.

A plurality of embodiments to remove the mandrel 34 from the solid unitary section of cured fuselage 10 will be described. In one embodiment, at least one support ring 52 (for example, including a first support ring 54 and a second support ring 56) may be utilized (FIG. 7). The support ring 52 (54, 56) may be mounted to the side ends of the thin lay-up mandrel element 26 by a bolt or screw 57 (FIG. 9) or any other attachment means. The support rings 52 may be mounted on the mandrel element either before or after the lay-up and curing steps. The support rings 52 allow for a separating force to be applied to the thin mandrel element 26, such that the inner mandrel shell 20 can be removed. Once the mandrel shell 20 is removed, the thin mandrel elements 26 are easily separated from the cured product.

Figure 8:
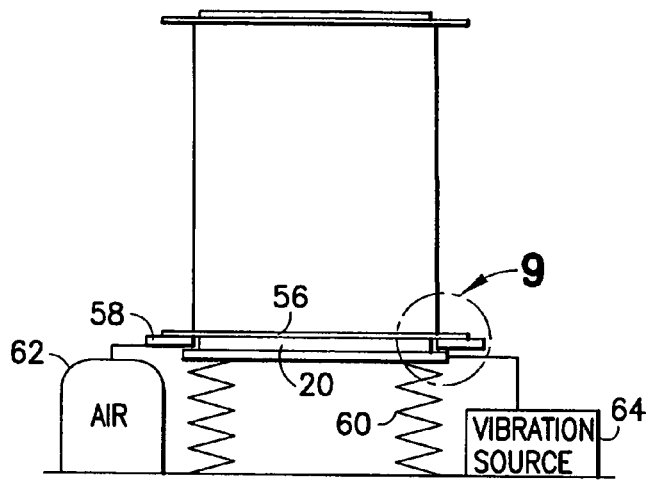
FIG. 8 is an illustration of a plurality of methods of removing the inner mandrel shell from out of the thin lay-up mandrel element illustrated in FIG. 7.

Referring to FIG. 8, the mandrel may be positioned vertically and one of the support rings 56 may be engaged to a lateral support structure 58. The cylindrical inner mandrel shell 20 can then be supported by a spring or other flexible support 60. In such an arrangement, gravity may be utilized to allow the relatively unsupported and heavy inner mandrel shell 20 to separate from the thin lay-up mandrel 26. In a further embodiment shown in FIGS. 8 and 9, an air supply 62 may be utilized to force air in between the thin lay-up mandrel 26 and inner mandrel shell 20 in order facilitate their separation. In still another embodiment also shown in FIGS. 8 and 9, a vibrational source 64 may alternately load the thin lay-up mandrel element 26 or inner mandrel shell 20 in order to facilitate their separation.

Figure 10:
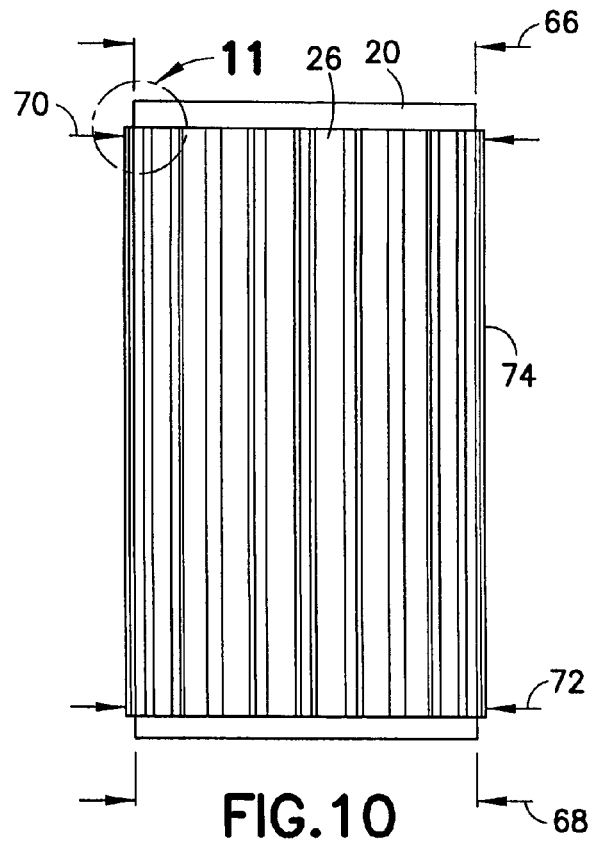
FIG. 10 is an illustration of an alternate feature of the mandrel assembly illustrated in the preceding figures, the embodiment illustrating a complemented tapered inner mandrel shell and tapered thin lay-up mandrel element.
Figure 11:
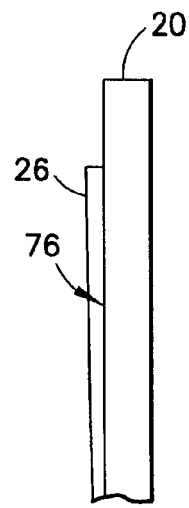
FIG. 11 is a detailed illustration of the tapers described and illustrated in FIG. 10.

As illustrated in FIGS. 10 and 11, separation may also be facilitated by the use of a tapered thin lay-up mandrel element 26 and an oppositely tapered one-piece cylindrical inner mandrel shell 20. The opposite tapers facilitate removal of inner mandrel shell 20. Tapers of about 0.5 degree are sufficient, but larger tapers may be used. In some of these embodiments, the inner mandrel shell 20 may include a smaller shell outer diameter 66 and a larger shell outer diameter 68. The thin lay-up mandrel 26 has a tapered inner surface, such that the thickness of the thin lay-up mandrel 26 varies from one end to the other. The thin lay-up mandrel 26 may include a larger plate inner dimension 70 and a smaller plate inner dimension 72. The larger plate inner dimension 70 complements the smaller shell outer diameter 66 and the smaller plate inner dimension 72 complements the larger shell outer dimension 68 such that a substantially uniform dimension lay-up surface 74 is generated. A detail of the counter tapers 76 is illustrated in FIG. 11 (shown slightly exaggerated). The counter tapers 76 allow the one-piece cylindrical inner mandrel shell 20 to be removed from the center of the thin lay-up mandrel element(s) 26 after curing by any of the removal methods described above. In this fashion, the manufacturing of a seamless section of an aircraft fuselage 10 is significantly improved.

While particular embodiments of the invention have been shown and described, numerous variations and alternative embodiments will occur to those skilled in the art. Accordingly, it is intended that the invention be limited only in terms of the appended claims.

What is claimed is:

1. A method of manufacturing a unitary seamless section of an aircraft fuselage, the method comprising:

disposing a plurality of caul plates onto an outer shell surface of a one-piece inner mandrel shell to form a mandrel with a lay-up surface, said caul plates arranged longitudinally parallel to the longitudinal axis of said one-piece inner mandrel shell and comprising a plurality of longitudinal stiffener channels formed into a caul outer surface;

laying up a plurality of resin impregnated stiffener fibers within said plurality of stiffener channels to form a plurality of stiffeners;

inserting a removable rubber mandrel into each of said plurality of stiffener channels; and laying up a plurality of resin impregnated skin fibers onto said lay-up surface while said mandrel rotates to form a unitary pre-cured section of an aircraft fuselage, wherein the top ends of said plurality of resin impregnated stiffener fibers form a flush mandrel surface and are in contact with said plurality of resin impregnated skin fibers.

2. A method as described in claim 1, further comprising:
curing said pre-cured section: and
removing said removable rubber mandrel.

3. A method as described in claim 1, further comprising:
rotating said mandrel horizontally continuously in one direction about a mandrel axis, said mandrel rotating adjacent at least one work platform;
laying up said plurality of resin impregnated stiffener fibers and said plurality of resin impregnated skin fibers from said work platform.

4. A method as described in claim 1, further comprising:
vacuum bagging said pre-cured section while said pre-cured section remains on said mandrel.

5. A method as described in claim 1, further comprising:
mounting at least one support ring to said plurality of caul plates;

curing said pre-cured section;
removing said removable rubber mandrel; and
supporting said plurality of caul plates using said at least one support ring while said cylindrical inner mandrel shell is removed.

6. A method as described in claim 1, further comprising:
forcing air in between said plurality of caul plates and said cylindrical inner mandrel shell to facilitate removal of said cylindrical inner mandrel shell.

7. A method as described in claim 1, further comprising:
applying a vibrational load to said plurality of caul plates to facilitate removal of said cylindrical inner mandrel shell.

8. A method as described in claim 1, further comprising:
utilizing a tapered cylindrical inner mandrel shell comprising a first shell end having a larger shell outer dimension and a second shell end having a smaller shell outer dimension;
utilizing a plurality of tapered caul plates comprising a first plate end having a smaller plate inner dimension and a second plate end having a larger plate inner dimension, said tapered caul plates complementing said tapered cylindrical inner mandrel shell to produce a substantially uniform dimension lay-up surface; wherein said tapered cylindrical inner mandrel shell and said plurality of tapered caul plates are complemented to facilitate removal of said tapered cylindrical inner mandrel shell.

9. A method of manufacturing a unitary seamless section of an aircraft fuselage, the method comprising:
disposing a thin lay-up mandrel element onto an outer shell surface of a inner mandrel shell to form a mandrel with a lay-up surface;
laying up a plurality of resin impregnated stiffener fibers within a plurality of longitudinal stiffener channels formed in said thin lay-up mandrel element:
inserting a removable rubber mandrel into each of said plurality of stiffener channels: and
laying up a plurality of resin impregnated skin fibers onto said lay-up surface while said mandrel rotates to form a unitary pre-cured section of an aircraft fuselage, wherein the top ends of said plurality of resin impregnated stiffener fibers form a flush mandrel surface and are in contact with said plurality of resin impregnated skin fibers.

10. A method as described in claim 9, further comprising:
rotating said mandrel horizontally continuously in one direction about a mandrel axis.

11. A method as described in claim 9, further comprising:
vacuum bagging said pre-cured section while said pre-cured section remains on said mandrel.

12. A method as described in claim 9, further comprising:
mounting at least one support ring to said thin lay-up mandrel element;
curing said pre-cured section; and
supporting said thin lay-up mandrel element using said at least one support ring while said cylindrical inner mandrel shell is removed.

13. A method as described in claim 9, further comprising:
forcing air in between said thin lay-up mandrel element and said cylindrical inner mandrel shell to facilitate removal of said cylindrical inner mandrel shell.

14. A method as described in claim 9, further comprising:
applying a vibrational load to said thin lay-up mandrel element to facilitate removal of said cylindrical inner mandrel shell.

* * * * *